(12) United States Patent
Kim

(10) Patent No.: US 11,285,766 B2
(45) Date of Patent: Mar. 29, 2022

(54) SYSTEMATIZED MULTI-POINT SENSORS UNIT FOR TIRE AND TIRE HAVING THE SAME

(71) Applicant: HANKOOK TIRE & TECHNOLOGY CO., LTD., Seoul (KR)

(72) Inventor: Jeong Heon Kim, Deajeon (KR)

(73) Assignee: HANKOOK TIRE & TECHNOLOGY CO., LTD., Seoul (KR)

( * ) Notice: Subject to any disclaimer, the term of this patent is extended or adjusted under 35 U.S.C. 154(b) by 126 days.

(21) Appl. No.: 16/521,955

(22) Filed: Jul. 25, 2019

(65) Prior Publication Data

US 2020/0031183 A1 Jan. 30, 2020

(30) Foreign Application Priority Data

Jul. 25, 2018 (KR) ........................ 10-2018-0086449

(51) Int. Cl.
| | |
|---|---|
| *B60C 23/06* | (2006.01) |
| *B60C 23/04* | (2006.01) |
| *H01Q 1/22* | (2006.01) |
| *B60C 11/24* | (2006.01) |

(52) U.S. Cl.
CPC .......... *B60C 23/064* (2013.01); *B60C 11/246* (2013.01); *B60C 23/0447* (2013.01); *B60C 23/0488* (2013.01); *H01Q 1/2241* (2013.01)

(58) Field of Classification Search
CPC . B60C 23/064; B60C 11/246; B60C 23/0447; B60C 23/0488; H01Q 1/2241

USPC ......................... 73/146–146.8; 340/442–443
See application file for complete search history.

(56) References Cited

U.S. PATENT DOCUMENTS

| | | | | |
|---|---|---|---|---|
| 5,631,426 A | * | 5/1997 | Jao ........................... | G01H 1/00 73/587 |
| 7,158,018 B2 | * | 1/2007 | Schick .................... | B60C 11/24 152/152.1 |
| 8,931,334 B1 | * | 1/2015 | Dudley, Jr. ........... | B60C 11/246 73/146.5 |
| 9,815,343 B1 | * | 11/2017 | Laflamme ............. | B60C 23/064 |
| 2004/0112128 A1 | * | 6/2004 | Liebemann ........... | B60T 8/1725 73/146 |
| 2004/0130442 A1 | * | 7/2004 | Breed .................... | G02B 27/01 340/443 |

(Continued)

FOREIGN PATENT DOCUMENTS

| | | |
|---|---|---|
| JP | 2003-320827 A | 11/2003 |
| JP | 2006-064565 A | 3/2006 |

(Continued)

*Primary Examiner* — Eric Blount
(74) *Attorney, Agent, or Firm* — Novick, Kim & Lee, PLLC; Jae Youn Kim; Jihun Kim

(57) ABSTRACT

A systematized multi-point sensors unit for a tire and a tire having the same are provided. More specifically, the systematized multi-point sensors unit includes: a sensor module composed of a plurality of sensors and attached onto an inner surface of a tire to monitor conditions of a tire and a road surface, and a connection member for connecting the plurality of sensors by wire, wherein the plurality of sensors are connected to each other by wire and arranged in a line in a manner of being perpendicular to a traveling direction of the tire.

8 Claims, 2 Drawing Sheets

(56) References Cited

U.S. PATENT DOCUMENTS

| | | | |
|---|---|---|---|
| 2007/0080795 A1* | 4/2007 | Ichikawa | B60C 23/0493 340/447 |
| 2008/0191840 A1* | 8/2008 | Kaga | G06K 19/07764 340/10.1 |
| 2008/0289407 A1* | 11/2008 | Gramling | G01P 15/09 73/146.5 |
| 2009/0049903 A1* | 2/2009 | Murakami | B60T 8/1725 73/146 |
| 2009/0058625 A1* | 3/2009 | Suzuki | B60C 23/0433 340/447 |
| 2009/0114005 A1* | 5/2009 | Blixhavn | B60C 23/0493 73/146.5 |
| 2010/0164705 A1* | 7/2010 | Blanchard | B60C 23/0411 340/442 |
| 2011/0087396 A1* | 4/2011 | Eregen | B60C 23/064 701/31.4 |
| 2012/0112898 A1* | 5/2012 | Yu | B60C 23/0493 340/442 |

FOREIGN PATENT DOCUMENTS

| | | |
|---|---|---|
| KR | 20-0450432 Y1 | 10/2010 |
| KR | 10-1198924 B1 | 11/2012 |

* cited by examiner

SYSTEMATIZED MULTI-POINT SENSORS UNIT FOR TIRE AND TIRE HAVING THE SAME

BACKGROUND OF THE DISCLOSURE

Field of the Invention

The present disclosure relates to a systematized multi-point sensors unit for a tire and a tire to which the sensors unit is applied. More particularly, it relates to a plurality of sensors which are systematically arranged and attached to several sites within the interior of the tire in a direction perpendicular to a traveling direction of the tire to detect conditions of the tire in real time, and a tire to which the sensors are applied.

Description of the Related Art

Although the role of tires is very important in driving motor vehicles, drivers are often easy to neglect to check the condition of the tires such as tire air pressure. If checking the condition of the tires is neglected, there occurs a possibility that tire air pressure may be insufficient, leading to an unexpected large accident as well as safety problems such as tire tread wear.

Particularly, in the upcoming era of autonomous driving, safety related technology for autonomous vehicles is the main concern. In order to ensure safety of the autonomous vehicles, sensors other than drivers should detect behavior of the tires occurring during vehicle driving and provide a direct warning signal or otherwise continuously provide information of the tires to a vehicle control unit and a road control system.

Accordingly, in recent years, attempts have been made continuously throughout the world to measure signals such as air pressure, pressure, temperature and acceleration of the tires by attaching a tire air pressure alarm device, i.e., a tire pressure monitoring system (TPMS) which is attached to an air pressure valve, onto the inner surface of the tire and adding functions of the TPMS.

Korean utility model registration No. 20-0450432 (titled "pressure sensor for measuring tire air pressure and a tire pressure monitoring system having the same") discloses technology for a tire air pressure sensor that can be easily mounted inside wheels of all types of motor vehicles and has low error in wireless transmission and reception of data and a tire pressure monitoring system having the tire air pressure sensor.

Another Korean registered patent No. 10-1198924 (titled "tire air pressure sensor module for a tire pressure monitoring system") discloses technology of solving problems of vibration, electric power consumption and the like that occur when a metallic antenna is utilized by configuring the module such that data measured by the sensor is transmitted via a flexible antenna.

In order for a sensor to perform its inherent functions of detecting behavior of the motor vehicle and providing a warning signal, it will be necessary to precisely identify the situation of the road surface on which the motor vehicle travels and any problem with respect to the condition of the tire itself.

However, even in the case of the existing patents as mentioned above, there is a limitation in completely detecting change in the condition that may occur in the tire and problems to be caused accordingly with only one sensor attached onto the inner surface of the tire. Therefore, it is necessary to acquire signals of temperature, pressure, acceleration and the like by attaching sensors to several sites of the inner surface of the tire other than a single site.

Therefore, the present disclosure proposes a technology of a systematized multi-point sensors unit for a tire for efficient and precise sensing of tire condition.

CITATION LIST

Patent Literature

Patent Literature 1: Korean Registered Patent Publication No. 10-1198924

Patent Literature 2: Korean Registered Utility Model Publication No. 20-0450432

SUMMARY OF THE INVENTION

In order to solve the problems as mentioned above, an object of the present disclosure is to provide a systematized multi-point sensors unit for a tire having multiple sensors attached to several sites of the tire to more precisely identify the situation of a road surface and the condition of the tire itself, and a tire to which the sensors unit is applied.

It is noted that technical problems to be solved by the present disclosure are not limited to the technical problems as mentioned above and other technical problems not mentioned above may be clearly understood from the following description by those who have ordinary skill in the art pertained to the present disclosure.

In accordance with one aspect of the present disclosure for accomplishing the object as mentioned above, there may be provided a systematized multi-point sensors unit comprising: a sensor module composed of a plurality of sensors and attached onto an inner surface of a tire to monitor conditions of a tire and a road surface, and a connection member for connecting the plurality of sensors by wire, wherein the plurality of sensors are arranged in a line in a manner of being perpendicular to a traveling direction of the tire.

In an embodiment of the present disclosure, the sensor module may comprise a main sensor module for performing wireless transmission and reception of data and receiving power; a sub-sensor module composed of a plurality of sensors disposed opposite to each other with respect to the main sensor module; and a power supply element for supplying power to the main sensor module, wherein the sub-sensor module is electrically connected to the main sensor module via the connection member to share data and power with the main sensor module.

In an embodiment of the present disclosure, the power supply element may be mounted to the main sensor module to supply power to the main sensor module.

In an embodiment of the present disclosure, the power supply element may be formed separately from the main sensor module and electrically connected to the main sensor module via the connection member to supply power to the main sensor module.

In an embodiment of the present disclosure, the power supply element is provided on a rim portion or a tread central portion of the tire such that deformation of the power supply element is hardly generated.

In an embodiment of the present disclosure, the power supply element may be of a battery or an energy harvester.

In an embodiment of the present disclosure, the connection member may be configured by an electrically conductive film connector.

In an embodiment of the present disclosure, the electrically conductive film connector may comprise a flexible printed circuit board.

In an embodiment of the present disclosure, two or more of the sensor modules may be provided together onto the inner surface of the tire.

In an embodiment of the present disclosure, an integral type film may be attached onto the entire inner surface of the tire in order to prevent tire air pressure from being leaked without a rubber inner liner inside the tire.

In an embodiment of the present disclosure, the sensor module may be attached to the inside of the tire by using an adhesive or a gluing agent.

In accordance with another aspect of the present disclosure for accomplishing the object as mentioned above, there may be provided a tire with a systematized multi-point sensors unit applied thereto, wherein the tire comprises tire sensors attached to the inside of the tire to detect conditions of a tire and a road surface and wherein the tire sensors comprise any one of the systematized multi-point sensors units according to the embodiments of the present disclosure.

DETAILED DESCRIPTION OF THE PREFERRED EMBODIMENTS

Figure 1:
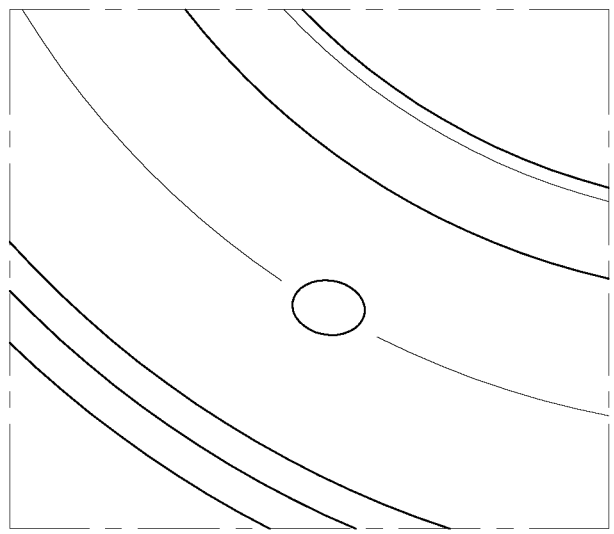
FIG. 1 is an enlarged view of an inner surface of a tire to which a single sensor for a tire according to the prior art is attached.

Hereinafter, the present disclosure will be described in detail with reference to the accompanying drawings. However, the present disclosure may be implemented in many different forms but not limited to embodiments described herein. In addition, in order to clearly describe the present disclosure, parts not related to the description are omitted and similar parts are denoted by like reference characters throughout the specification.

As used throughout the specification, when it is described that a certain part is "connected to (or joined to, contacts, coupled to)" another part, the description includes not only the case where the certain part is "connected directly" to another part but also the case where the certain part is "connected indirectly" to another part with other part(s) interposed therebetween. In addition, when a certain part is referred to as "comprising" a certain element, it does not mean that other elements are excluded but means that the part may further comprise other elements unless specifically stated otherwise.

Terms as used herein are intended to describe a specific embodiment but not limit the present disclosure. Singular expressions include plural expressions unless the context clearly indicates otherwise. It is to be understood that the term "comprising" or "having" as used herein is intended to designate that there are features, numbers, steps, operations, components, parts, or combinations thereof, but not to exclude the possibility that one or more other features, numbers, steps, operations, components, parts, or combinations thereof exists or are added.

Preferred embodiments of the present disclosure will be described below in more detail with reference to the accompanying drawings.

In the era of autonomous driving recently, attempts have been made to measure signals of air pressure, pressure, temperature and acceleration of a tire by attaching a tire pressure monitoring system (TPMS) which is attached to an air pressure valve onto an inner surface of the tire and adding functions of the TPMS.

In such upcoming era of autonomous driving, sensors other than drivers should detect behavior of vehicles occurring during driving and provide a direct warning signal, or otherwise continuously provide information to a vehicle control unit and a road control system.

FIG. 1 shows the tire pressure monitoring system (TPMS) attached onto the inner surface of the tire as described above. A system for measuring tire air pressure using the tire pressure monitoring system (TPMS) is a kind of wireless transmission technology wherein the system measures rise and fall inside the vehicle tire and measures pressure and temperature data inside the vehicle tire during traveling or stopped state and then delivers them to a main dash board in a driver's compartment.

If an abnormality is detected in the pressure and the like inside the vehicle tire, it is notified to a driver in the form of ringing sound or voice in order for the driver to take precautions to reliably maintain the pressure and temperature inside the tire in the standard range, thereby preventing accidents due to problems of the tire.

Furthermore, in the era of autonomous driving, sensors for tires serve to not only provide a warning signal but also provide information to a vehicle control unit and a road control system and intervene in driving the vehicle by themselves when there is an abnormality in the tire. Therefore, technology of more precisely sensing conditions of tires is becoming a main concern.

Conventional technologies present more efficient and precise internal sensor technologies for tires. However, in order to significantly reduce the risk of safety accidents such as accidents in the era of autonomous driving, there is a limit to precise measurement of the conditions of the tire with only one sensor.

Accordingly, the present disclose proposes a systematized multi-point sensors unit suitable for tires and a tire to which the systematized multi-point sensors unit is applied. Preferred embodiments of the present disclosure will be described below.

Figure 2:
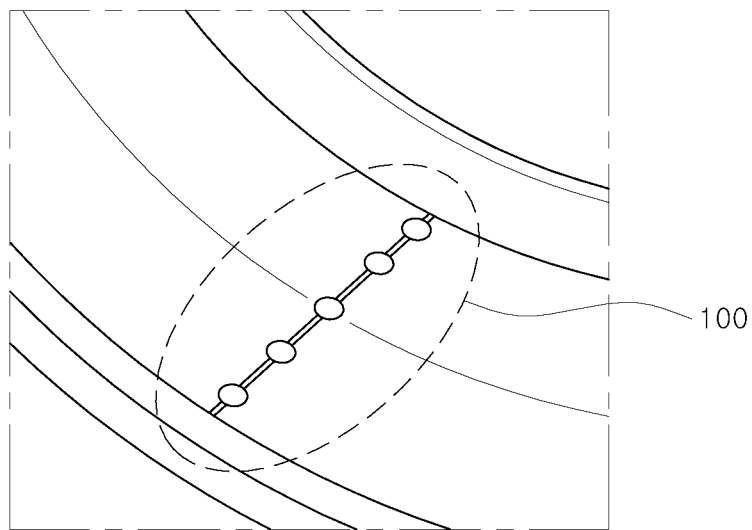
FIG. 2 is an enlarged view of an inner surface of a tire, onto which a systematized multi-point sensors unit for a tire according to an embodiment of the present disclosure is attached.
Figure 3:
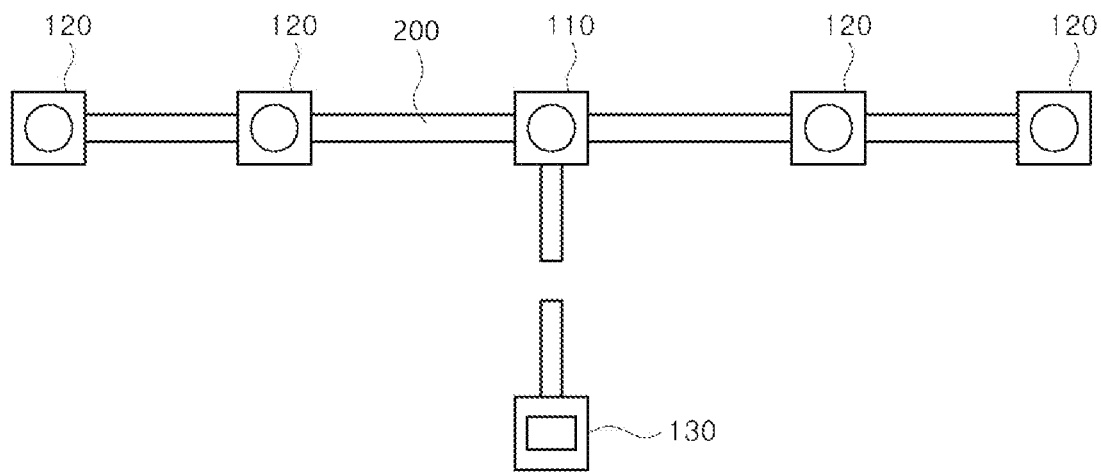
FIG. 3 is block diagram of a systematized multi-point sensors unit for a tire according to an embodiment of the present disclosure.

FIG. 2 shows an inner surface of a tire onto which a systematized multi-point sensors unit for a tire according to an embodiment of the present disclosure is attached. FIG. 3 shows a block diagram of the systematized multi-point sensors unit for a tire.

The systematized multi-point sensors unit according to an embodiment of the present disclosure comprises: a sensor module 100 composed of a plurality of sensors and attached onto an inner surface of a tire to monitor conditions of a tire and a road surface, and a connection member 200 for connecting the plurality of sensors by wire, wherein the plurality of sensors are arranged in a line in a manner of being perpendicular to a traveling direction of the tire.

In this embodiment in which the plurality of sensors are arranged in a line in a manner of being perpendicular to the traveling direction of the tire, as compared with the case where the plurality of sensors are arranged in a line along the traveling direction of the tire, data on the conditions of the central portion and both outer peripheral portions of the tire as well as the conditions of the ground surface can be collectively collected so that more precise monitoring of the overall conditions of tires and road surfaces is possible.

The plurality of sensors may be attached at five positions to ensure that the overall conditions of the tire are precisely identified with the minimum number of sensors in consideration of weight of the entire sensors. Alternatively, more sensors may be attached inside the tire as desired.

The plurality of sensors constituting the sensor module 100 according to an embodiment of the present disclosure comprise a main sensor module 110 for performing wireless transmission and reception of data and including a power supply element; and a plurality of sub-sensor modules 120 disposed opposite to each other with respect to the main sensor module 110 and electrically connected to the main sensor module 110 via the connection member to share data and power with the main sensor module.

However, optionally, the main sensor module 110 may be disposed on one side, not on the central portion of the sensor module 100 in order to ensure efficient sharing of data and power while the plurality of sub-sensor modules 120 other than the main sensor module may be arranged in a line along with the main sensor module 110.

The sub-sensor modules 120 can measure acceleration of the tire and transmit the data obtained to the main sensor module 110 through an electric wire connection, thereby sharing the data of the plurality of sensors through the main sensor module 110.

The main sensor module 110 serves to measure air pressure and temperature inside the tire as well as the acceleration of the tire and to collect data and transmit and receive the data. Further, as the main sensor module also includes the power supply element 130, electric power supplied through the power supply element is shared with the plurality of sensors constituting the sub-sensor module 120.

In an embodiment of the present disclosure, the power supply element 130 is configured as a battery such as a coin cell, or an energy harvester and attached to the main sensor module 110 to supply power to the main sensor module 110.

The energy harvester refers to devices or elements used for energy harvesting wherein the energy harvesting refers to a technology of collecting energy from natural energy sources such as sunlight, vibration, heat, wind and the like and converting the energy collected into useful electric energy by means of individual devices, such as photovoltaic devices.

The energy harvesting technology may be variously classified according to methods and devices used for obtaining energy. Since the technology makes it possible to obtain electric energy directly from nature, it is highlighted as an eco-friendly energy utilization technology that can maintain stability, security and sustainability of energy supply and reduce environmental pollution.

Specifically, this embodiment adopts the technology to harvest energy such as vibration, heat, pressure and the like that are generated in the tire during vehicle traveling without being discarded and convert the harvested energy to electrical energy wherein a specific constitution therefor comprises a unit for converting and collecting the energy to be generated and a unit for accumulating the collected energy.

The energy supply element 130 may be configured as the energy harvester wherein the energy harvester includes an energy conversion and collection unit for harvesting energy such as vibration, heat and pressure and the like to be generated during vehicle traveling and converting the collected energy into electric energy, and an energy accumulation unit for accumulating the electric energy.

Accordingly, in this embodiment of the present disclosure, it is possible to recycle energy to be discarded during vehicle supply and supply electric power obtained from the recovery of waste energy in a regenerative manner in response to electric power consumption of sensors for the tire. Since most of the electric power consumption of the sensors for the tire occurs during vehicle traveling, this embodiment is excellent in terms of energy efficiency and can also serve as a sustainable eco-friendly energy supply means.

According to an embodiment of the present disclosure, the battery or energy harvester as the energy supply element 130 may be configured such that it is arranged to be separated from the main sensor module 110 and connected to the main sensor module 110 by wire.

In this embodiment, when the energy supply element 130 is required to be replaced with new one because the battery reaches the end of service life or any problem occurs in the energy harvester, the energy supply element 130 can be replaced with new one more easily with compared to the case where the energy supply element 130 is attached to the main sensor module 110.

Further, the energy supply element 130 formed separately and arranged to be separated from the main sensor module 110 according to an embodiment of the present disclosure may be attached to a rim portion or a central portion of a tire tread in which deformation is hardly generated.

As a result, fixing force of the battery or energy harvester constituting the energy supply element 130 to the tire is increased and its durability against high-speed rotational conditions during high-speed traveling can be improved.

As described above, in the case where a system for transmitting and receiving data collected and sharing power supply is implemented by the main sensor module 110 in accordance with an embodiment of the present invention, the plurality of sensors constituting the sub-sensor module 120 do not require a data transmission and reception device and an energy supply device separately so that there is a significant advantage in that overall weight and size of the sensors for the tire can be reduced.

The connection member 200 electrically interconnects between the main sensor module 110 and the sub-sensor modules 120 by wire. On the other hand, in the embodiment in which the energy supplying element 130 is formed separately and arranged to be separated from the main sensor module 110, as described above, the connection member electrically connects between the main sensor module 110 and the energy supply element 130 by wire.

According to an embodiment of the present disclosure, the connection member 200 may be configured to have electrical conductivity for electrical connection and configured as a film connector to reduce thickness and weight of the inventive sensors unit of the present disclosure. In a specific embodiment, the film connector may be a flexible printed circuit board (FPCB).

A printed circuit board (PCB) is an electronic component made by forming conductor circuits having good electrical conductivity on an insulator, while the flexible printed circuit board is an electronic component to overcome vulnerable points of the conventional printed circuit boards in order to meet the trend of miniaturization and complexity of electronic products.

The flexible printed circuit board that is an electronic component developed in the process of miniaturizing and lightening electronic products has been widely used as a core component of many electronic products because it is excellent in workability and has heat resistance. In addition, when the flexible printed circuit board is used, it is advantageous in that thinning and lightening as well as three-dimensional high density wiring of the inventive unit of the present disclosure can be made.

In addition, in an embodiment of the present disclosure, a semiconductor process or a 3D printing process is utilized for lightening and thinning of the inventive unit of the present disclosure.

The 3D printing technology refers to a technology that extracts objects from a printer. The reason for being called as 3D printing is because it is similar to the existing printers that print letters on papers but creates three-dimensional models. Unlike the conventional method of manufacturing materials, most of the 3D printers adopt the way of stacking materials in layers to complete the desired shape.

A semiconductor manufacturing process imparts electrical characteristics to silicon through processes such as cutting and polishing the silicon into very thin form to make a wafer that is the basic material of semiconductor.

By implementing the conductive film connector through the semiconductor manufacturing process or the 3D printing technology, it is possible to maximize the thinning and lightening of the inventive unit of the present disclosure, which is composed of a plurality of sensors.

As described above, in the case where extreme thinning of the inventive unit is implemented, multiple tire sensors of the systematized five-point or multi-point sensors unit according to an embodiment of the present disclosure can be attached on the inner surface of the tire as necessary, thereby further enhancing accuracy of monitoring the conditions of the tire.

For example, if sixteen systematized five-point sensors units according to an embodiment of the present disclosure are attached together on the inner surface of the tire, a total of 80 sites on the inner surface of the tire can be precisely monitored.

However, if the number of sensing positions to which the sensors are attached increases, weight of the systematized multi-point sensors unit of the present disclosure may possibly increase. In order to solve this problem, an integral type film is attached onto the entire inner surface of the tire to be used in place of a rubber inner liner which serves to prevent tire air pressure from being leaked, weight increase problem expected in the embodiment as mentioned just above can be solved.

Therefore, this embodiment may be characterized by attaching the integral type film onto the entire inner surface of the tire in order to prevent tire air pressure from being leaked without the rubber inner liner inside the tire.

Further, an embodiment of the present disclosure is characterized in that the sensor modules are attached onto the inner surface of the tire by using an adhesive or a gluing agent in a liquid or slurry state.

Consequently, embodiments of the present disclosure make it possible to attach tire sensors to various sites inside the tire so that it is possible to identify more accurate conditions of the tire and the road surface. Further, although the tire sensor is constituted by a plurality of sensors, total weight and size of the systematized multi-point sensors unit according to embodiments of the present disclosure can be reduced because the plurality of sensors are systematized in multi points.

On the other hand, it is possible to apply the systematized multi-point sensors unit for the tire according to embodiments of the present disclosure in plural together inside one and the same tire, as desired. In this case, thinning and lightening of the plurality of the systematized multi-point sensors units can be achieved by means of the film connector. Further, attaching the integral type film onto the entire inner surface of the tire and to make it act as a rubber inner liner makes it possible to solve the weight increase problem of a whole sensors system.

One advantageous effect of embodiments of the present disclosure as described above is that as the systematized multi-point sensors unit is attached onto the inner surface of the tire in a direction perpendicular to a traveling direction of the tire, it is possible to more precisely identify the entire conditions of the tire with a suitable minimum number of sensors.

Another advantageous effect of embodiments of the present disclosure as described above is that if it is necessary to perform detailed monitoring of the tire, the detailed monitoring can be performed by applying a plurality of the systematized multi-point sensors units together in one and the same tire and that it is possible to reduce weight and size of the entire sensors system by providing functions of power supply and wireless data transmission and reception only to the main sensor module.

It is to be understood that effects of embodiments of the present disclosure are not limited to the effects as mentioned above but include all effects that can be deduced from the detailed description of the present disclosure or constitutions set forth in the claims.

The foregoing description of the present disclosure is intended to be illustrative. It will be understood by those skilled in the art that the present disclosure may be easily embodied in other specific forms without changing the technical idea or essential characteristics thereof. Therefore, it is to be understood that the embodiments as described above are illustrative in all aspects and not restrictive. For example, each of components described to be a unity form may be implemented in a distributed manner. Likewise, components described to be distributed may also be implemented in a combined manner.

The scope of the present disclosure is defined by the appended claims and all changes or modifications derived from the meaning and scope of the claims and the equivalents thereof should be construed to be covered by the scope of the present disclosure.

What is claimed is:

1. A tire comprising:
    a sensor module including a plurality of sensors and configured to be attached onto an inner surface of the tire to monitor conditions of the tire and a road surface; and
    a connection member for connecting the plurality of sensors,
    wherein the plurality of sensors are arranged in a line perpendicular to a traveling direction of the tire,
    wherein the plurality of sensors comprise:
    a main sensor for performing wireless transmission and reception of data;
    two groups of sub-sensors disposed opposite to each other with respect to the main sensor; and
    a power supply element for supplying power to the main sensor,
    wherein the two groups of sub-sensors are electrically connected to the main sensor via the connection member to share data and power with the main sensor, and
    wherein the tire further includes an integral type film attached on the entire inner surface of the tire in order to prevent tire air pressure from being leaked without a rubber inner liner inside the tire.

2. The tire according to claim 1, wherein the sensor module is attached onto the inner surface of the tire by using an adhesive or a gluing agent.

3. The tire according to claim 1, wherein the connection member includes a plurality of conductive film connectors, each of the plurality of conductive film connectors electrically connecting two adjacent sensors of the plurality of sensors.

4. The tire according to claim 1, wherein the power supply element is mounted on the main sensor to supply power to the main sensor.

5. The tire according to claim 1, wherein the power supply element is disposed separately from the main sensor and electrically connected to the main sensor via the connection member to supply power to the main sensor.

6. The tire according to claim 5, wherein the power supply element is disposed on a rim portion or a tread central portion of the tire.

7. The tire according to claim 1, wherein the power supply element includes a battery or an energy harvester.

8. The tire according to claim 3, wherein the plurality of conductive film connectors comprise a flexible printed circuit board.

\* \* \* \* \*